United States Patent [19]

Holley et al.

[11] Patent Number: 5,105,308
[45] Date of Patent: Apr. 14, 1992

[54] BICYCLE TIRE REFLECTOR ORGANIZATION

[76] Inventors: Harvard A. Holley; Zachary J. Holley, both of 2832 E.S. Bearcreek Dr., Merced, Calif. 95340

[21] Appl. No.: 609,234

[22] Filed: Nov. 5, 1990

[51] Int. Cl.⁵ .............................................. G02B 5/12
[52] U.S. Cl. ................................... 359/515; 359/524; 301/111
[58] Field of Search ............... 350/97, 98, 99; 40/542, 40/587, 594, 615; 301/95, 111

[56] References Cited

U.S. PATENT DOCUMENTS

| | | | |
|---|---|---|---|
| 4,194,810 | 3/1980 | Eller | 359/524 |
| 4,285,573 | 8/1981 | Stone | 359/524 |

FOREIGN PATENT DOCUMENTS 2496041  6/1982  France .............................. 359/524

Primary Examiner—Loha Ben
Attorney, Agent, or Firm—Leon Gilden

[57] ABSTRACT

An apparatus in association with a bicycle tire and the like which may be retractably secured to the tire, whereupon an elongate strip formed with spaced cut-outs permit securement of the elongate strip to an exterior side wall of the tire, wherein the strip is formed of a multi-layered, multi-colored strip organization to effect reflection of the tire in use within an associated bicycle. Triangular reflective segments may be adhesively and retractably mounted into the cut-outs in securement of the organization to the associated tire.

4 Claims, 4 Drawing Sheets

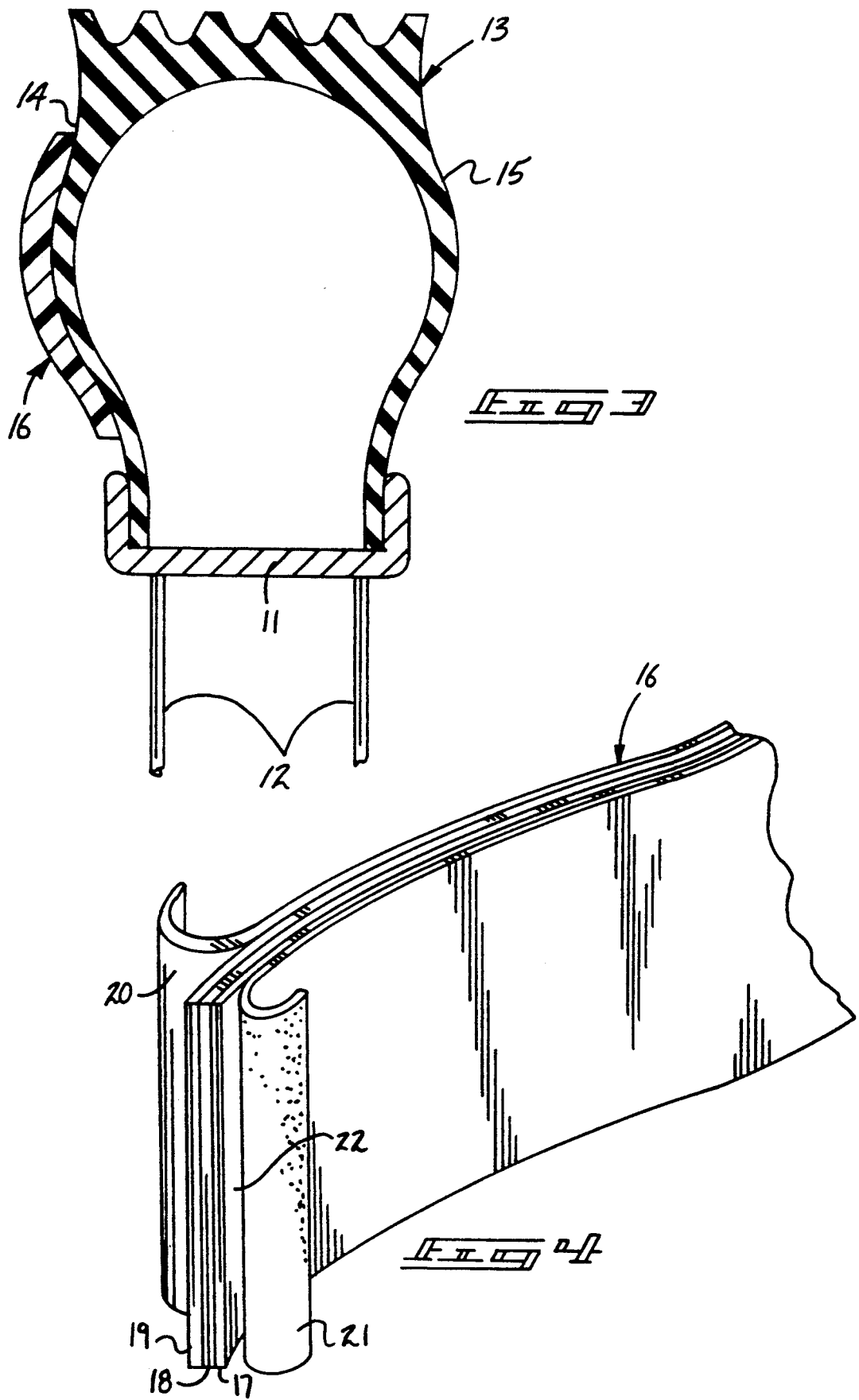

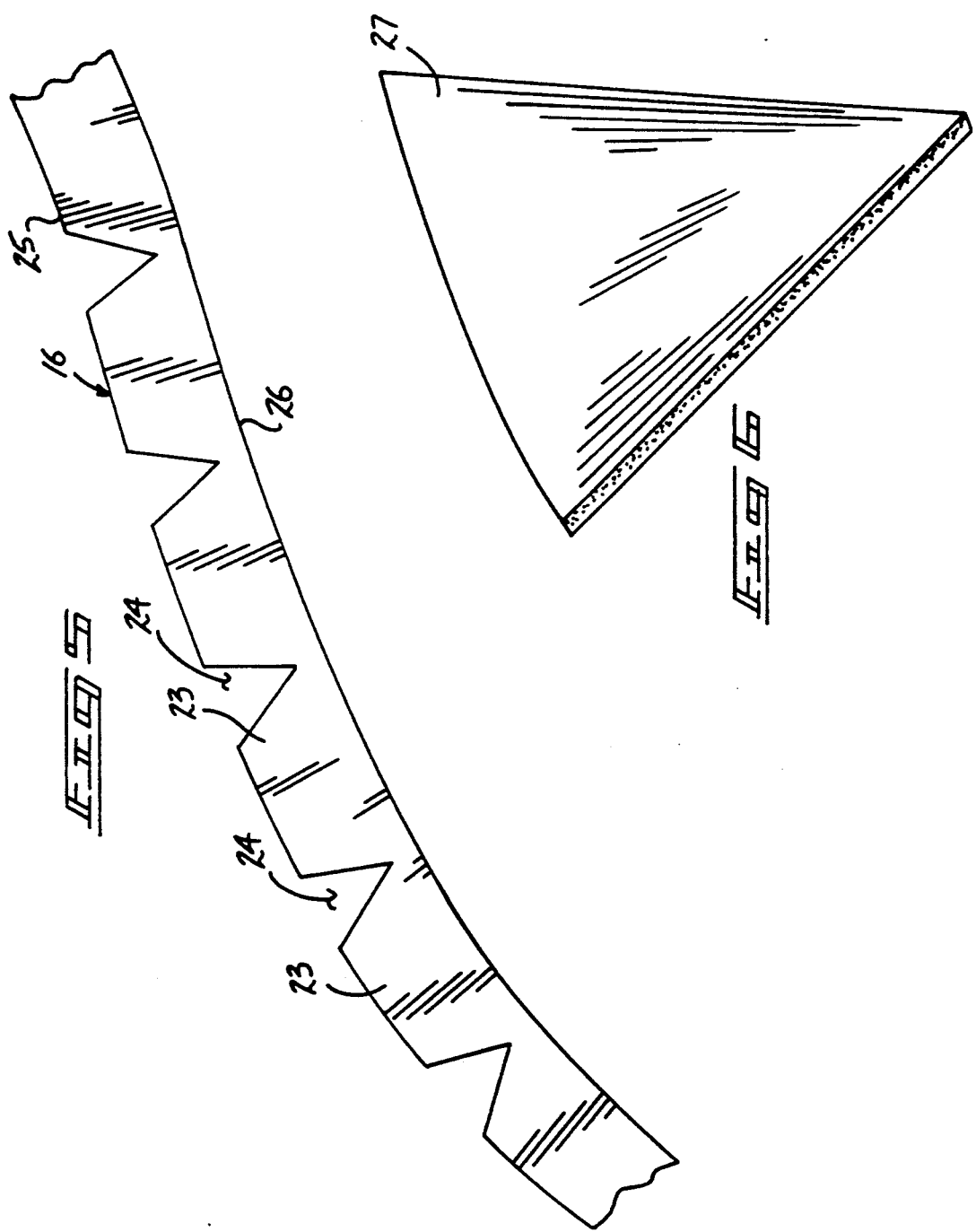

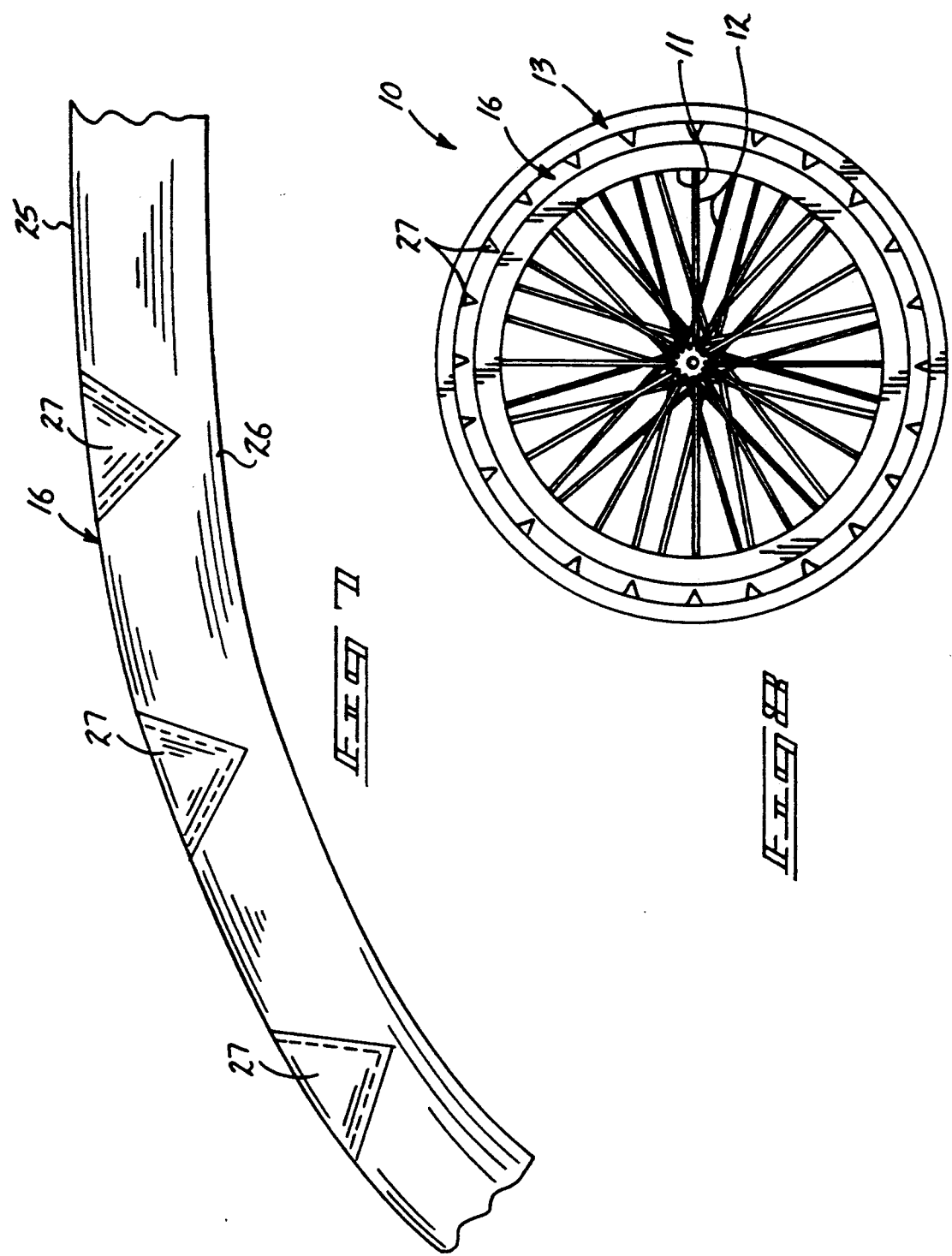

BICYCLE TIRE REFLECTOR ORGANIZATION

BACKGROUND OF THE INVENTION

1. Field of the Invention

The field of invention relates to bicycle tire organizations, and more particularly pertains to a new and improved bicycle tire reflector organization utilizing a reflective compound or a flexible strip retractably mounted to the tire to effect reflection of the tire in use.

2. Description of the Prior Art

Various reflective apparatuses are utilized in the prior art to provide safety and enhance visual observation of associated tires. Such organizations may be found in U.S. Pat. No. 4,470,663 to Trasch, et al. wherein a member is fixedly secured to spaced spokes of an associated tire, wherein the member includes a reflective organization mounted thereon.

U.S. Pat. No. 4,767,185 to Lyons sets forth a reflector that is mounted rearwardly of an associated bicycle that is spun upon air being directed through the organization to provide rearward visibility and reflection.

U.S. Pat. No. 4,284,328 to Drews sets forth fender trim which may be mounted to a vehicle to provide rearward deflection and enhance visibility thereof.

U.S. Pat. No. 434,801 to Jiminez, et al. sets forth various reflective organizations mounted to various portions of a bicycle enhance visibility thereof.

U.S. Pat. No. 4,003,630 to Kirk sets forth a reflective structure that may be retractably mounted to an associated bicycle in use.

As such, it may be appreciated that there continues to be a need for a new and improved bicycle tire reflector organization as set forth by the instant invention which addresses both the problems of ease of use as well as effectiveness in construction to provide enhanced visibility of an associated bicycle tire and vehicle and in this respect, the present invention substantially fulfills this need.

SUMMARY OF THE INVENTION

In view of the foregoing disadvantages inherent in the known types of bicycle reflector structure now present in the prior art, the present invention provides a bicycle tire reflector organization wherein the same provides for structure to be retroactively mounted to an associated bicycle tire to enhance visibility of the bicycle tire and associated bicycle structure. As such, the general purpose of the present invention, which will be described subsequently in greater detail, is to provide a new and improved bicycle tire reflector organization which has all the advantages of the prior art bicycle reflective structure and none of the disadvantages.

To attain this, the present invention provides an apparatus in association with a bicycle tire and the like which may be retractable secured to the tire, whereupon an elongate strip formed with spaced cut-outs permit securement of the elongate strip to an exterior side wall of the tire, wherein the strip is formed of a multi-layered, multi-colored strip organization to effect reflection of the tire in use within an associated bicycle. Triangular reflective segments may be adhesively and retractably mounted into the cut-outs in securement of the organization to the associated tire.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle tire reflector organization which has all the advantages of the prior art bicycle reflective structures and none of the disadvantages.

It is another object of the present invention to provide a new and improved bicycle tire reflector organization which may be easily and efficiently manufactured and marketed.

It is a further object of the present invention to provide a new and improved bicycle tire reflector organization which is of durable and reliable construction.

An even further object of the present invention is to provide a new and improved bicycle tire reflector organization which is susceptible of a low cost of manufacture with regard to both materials and labor, and which accordingly is then susceptible of low prices of sale to the consuming public, thereby making such bicycle tire reflector organizations economically available to the buying public.

Still yet another object of the present invention is to provide a new and improved bicycle tire reflector organization which provides in the apparatuses and methods of the prior art some of the advantages thereof, while simultaneously overcoming some of the disadvantages normally associated therewith.

Still another object of the present invention is to provide a new and improved bicycle tire reflector organization wherein the same provides for reflective and luminescent material that may be retractably mounted to an associated bicycle tire to enhance visibility of the bicycle tire and bicycle in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2, in the direction indicated by the arrows.

FIG. 4 is a diagrammatic isometric illustration of the laminate utilized by the instant invention.

FIG. 5 is an orthographic side view of the laminate strip utilized by the instant invention.

FIG. 6 is an isometric illustration of a triangular segment utilized in cooperation with the laminate strip of the instant invention.

FIG. 7 is an orthographic side view of the laminate strip and replacement triangular segments utilized by the instant invention.

FIG. 8 is an orthographic side view, taken in elevation, setting forth the use of the laminate strip and reflective segments mounted upon an associated bicycle tire for enhanced reflection thereof.

DESCRIPTION OF THE PREFERRED EMBODIMENT

Figure 1:
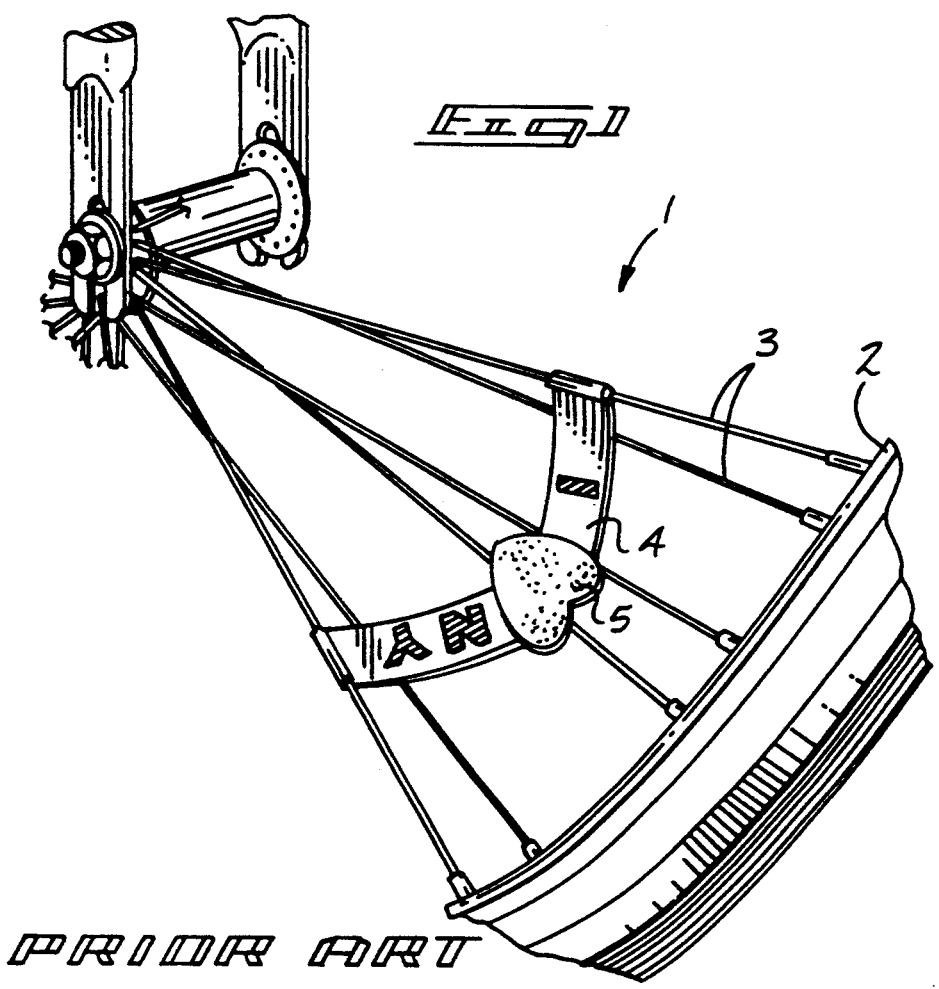
FIG. 1 is an isometric illustration of a prior art bicycle tire reflector structure.
Figure 2:
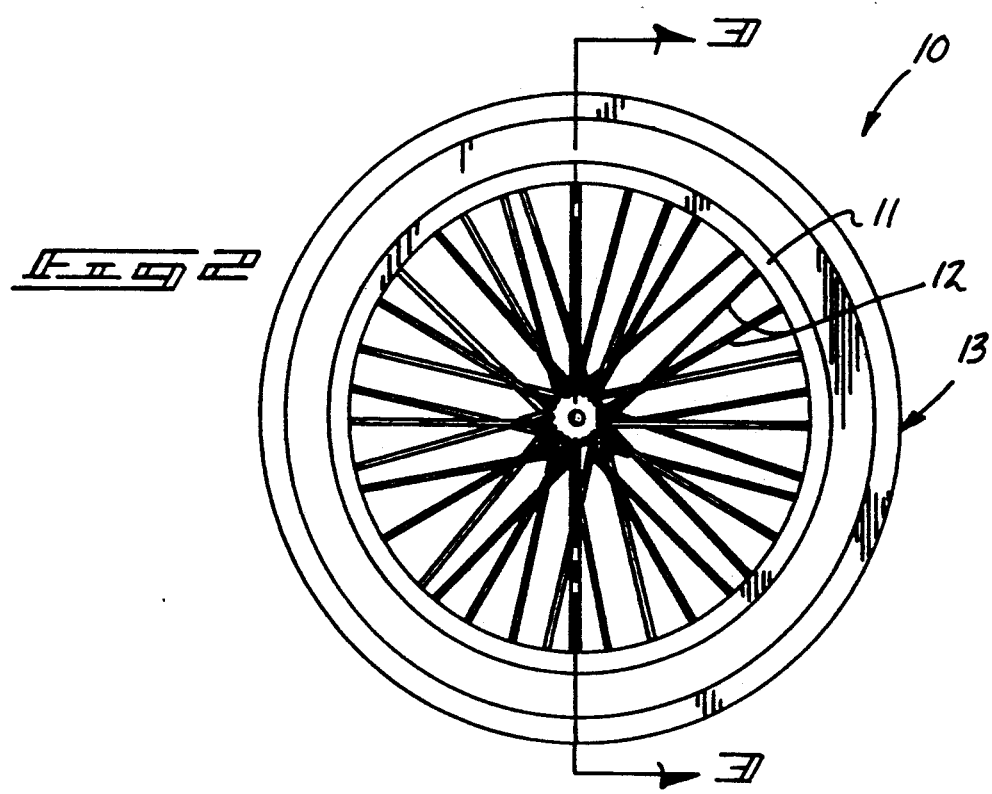
FIG. 2 is an orthographic side view, taken in elevation, of the instant invention.

With reference now to the drawings, and in particular to FIGS. 1 to 8 thereof, a new and improved bicycle tire reflector organization embodying the principles and concepts of the present invention and generally designated by the reference numeral 10 will be described.

FIG. 1 illustrates a typical prior art bicycle reflector structure 1, wherein a bicycle wheel rim 2 utilizing convention radial spokes 3 mounts a strip 4 onto spaced spokes utilizing reflector components 5 mounted on the strip 4 to enhance visibility of the bicycle tire.

More specifically, the bicycle tire reflector organization 10 of the instant invention essentially comprises a wheel rim 11 mounting a pneumatic tire 13 circumferentially thereabout, with the wheel rim 11 including conventional radial spokes 12 secured to a central hub. The pneumatic tire 13 includes a first side wall 14 and a second side wall 15. The organization illustrates a reflective and luminescent laminate strip 16 adherably secured to the first side wall 14, where it is understood that a like strip may be mounted to the second side wall 15, as desired. The reflective laminate strip 16 includes a flexible base layer 17, wherein the base layer 17 defines a base luminescent and reflective coloration. A first peel-away 18 defined by a first reflective and luminescent coloration is removably and coextensively mounted to a top surface of the base layer. Similarly, second and third respective peel-away layers 19 and 20 each defined by a respective second and third reflective and luminescent coloration are mounted in successive layers that permit selective removal to modify and alter coloration as desired of the reflective luminescent coloration to be visually observed by bystanders. An adhesive peel-away backing layer 21 exposes an adhesive 22 to permit securement of the base layer 17 to one or both of the side walls 14 and 15. Reference to FIG. 5 illustrates the laminate strips 16 formed by a series of successive equally spaced trapezoidal segments 23 secured to one another by a continuous inner edge 26 spaced from a discontinuous outer perimeter edge 25. "V" shaped cut-outs 24 defining recesses equally spaced relative to one another are directed through the outer perimeter edge 25 to permit application and securement of the laminate strips 16 to tires of varying diameters, wherein the "V" shaped cut-outs permit accommodation of various tires and their diameters. Reflective triangular segments 27 formed with adhesive backing are selectively positioned and secured within each of the "V" shaped cut-outs 24 upon the reflective and luminescent strips 16 secured to an associated side wall to provide a continuous side wall, wherein the segments 27 may be formed of a further coloration to provide contrasting luminescence and coloration to enhance visual observation of the strips 16 once secured to an associated side wall. The contrasting coloration provided by the triangular segments and the main body of the laminate strips 16 enhances such visibility.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle tire reflector organization comprising, in combination, a wheel rim, the wheel rim including a pneumatic tire secured circumferentially thereabout,
and
the pneumatic tire including a first side wall and a second side wall,
and
at least one reflective and luminescent laminate strip adherably mounted to at least one of the side walls, and
wherein the reflective laminate strip includes a flexible base layer, a first peel-away layer coextensively mounted upon the base layer, a second peel-away layer mounted upon the first peel-away layer, and a third peel-away layer mounted on the second peel-away layer, and the base layer defined by a base layer reflective and luminescent in coloration, the first peel-away layer defined by a first reflective and luminescent coloration contrasting to the base reflective and luminescent coloration, and the second peel-away layer including a second reflective and luminescent coloration in contrast to the base reflective and luminescent coloration and the first reflective and luminescent coloration, and the third peel-away layer including a third reflective and luminescent coloration in contrast to the base reflective and luminescent coloration, the first reflective and luminescent coloration and the second reflective and luminescent coloration.

2. An apparatus as set forth in claim 1 including a peel-away adhesive backing layer removably mounted to the base layer on an exterior side thereof spaced from the first peel-away layer, with an adhesive positioned between the peel-away adhesive layer and the base layer, whereupon removal of the peel-away adhesive layer exposes the adhesive for securement to one of the side walls.

3. An apparatus as set forth in claim 2 wherein the reflective and luminescent laminate strip includes a continuous inner edge spaced from a discontinuous outer perimeter edge, including a series of equally spaced "V" shaped cut-outs directed into the reflective and luminescent laminate strip from the outer perimeter edge.

4. An apparatus as set forth in claim 3 including a plurality of reflective triangular segments mounted within the "V" shaped cut-outs, wherein the triangular segments include a further coloration in contrast to the coloration of the base layer, the first peel-away layer, the second peel-away layer, and the third peel-away layer.

* * * * *